United States Patent [19]
Crisick et al.

[11] Patent Number: 5,852,955
[45] Date of Patent: Dec. 29, 1998

[54] CLIPLESS BICYCLE PEDAL SYSTEM

[76] Inventors: William E. Crisick, 3593 Whitehaven Dr., Walnut Creek, Calif. 94598; David F. Ortega, 206 Alameda de las Pulgas, Redwood City, Calif. 94062

[21] Appl. No.: 803,760

[22] Filed: Feb. 21, 1997

Related U.S. Application Data

[63] Continuation-in-part of Ser. No. 548,457, Oct. 26, 1995, abandoned.

[51] Int. Cl.$^6$ ........................................... G05G 1/14
[52] U.S. Cl. .................................. 74/594.6; 74/594.4
[58] Field of Search .......................... 74/594.6, 594.4; 36/131, 132

[56] References Cited

U.S. PATENT DOCUMENTS

| | | | |
|---|---|---|---|
| 4,377,952 | 3/1983 | Gamondes | 74/594.6 |
| 4,840,086 | 6/1989 | Bidal | 74/594.6 |
| 5,131,291 | 7/1992 | Beyl | 74/594.4 X |
| 5,142,938 | 9/1992 | Sampson | 74/594.4 X |
| 5,251,508 | 10/1993 | Robbins | 74/594.4 X |
| 5,269,200 | 12/1993 | Hawkins | 74/594.6 |
| 5,381,708 | 1/1995 | Liao | 74/594.6 |
| 5,606,894 | 3/1997 | Bryne | 74/594.4 X |

*Primary Examiner*—Charles A. Marmor
*Assistant Examiner*—Saúl J. Rodríquez

[57] ABSTRACT

This invention comprises a pedal (18) with engaging mechanisms (41) fixed thereon, and a cleat (10) affixed to a bicyclist's shoe by a clamp (101), thereby allowing the neutral position of the float to be adjusted and controlled and indexed. The cleat (10) is cylindrical, with fractionally cylindrical slots (12) formed thereon. The engaging mechanisms comprise a concave, fractionally cylindrical tongue (20) corresponding to the slots (12) in the cleat (10). Tongue (20) is spring loaded, and cooperates with the slots (12) in the cleat (10) to releasably capture the cleat (10) on the pedal (18). The fractionally cylindrical shape of the tongue (20) and slots (12) allow a predetermined and adjustable amount of float of the cleat (10) and the rider's foot, while remaining securely captured on the pedal (18).

11 Claims, 7 Drawing Sheets

CLIPLESS BICYCLE PEDAL SYSTEM

BACKGROUND—CROSS REFERENCE TO RELATED APPLICATIONS

This is a continuation-in-part of application Ser. No. 08/548,457, filed 26 Oct. 1995, now abandoned.

BACKGROUND OF THE INVENTION

1. Field of the Invention

The present invention relates to bicycle components, equipment and accessories; more particularly it relates to bicycle pedals, and specifically to pedal-and-cleat systems, commonly referred to as "clipless bicycle pedals."

2. Discussion of Prior Art

The popularity of clipless bicycle pedals is growing among bicyclists participating in racing, touring, and recreational bicycle riding, both off-road, usually described as "mountain biking", and on-road. The advantages of clipless pedal systems have been thoroughly described, recited and evaluated in prior art cited herein. Likewise, the disadvantages of both conventional toe-clip-and-pedal, and currently available clipless pedal systems have been well documented. While the prior art in clipless pedal system design has sought to overcome these deficiencies there has not heretofore been a completely satisfactory solution.

Some of the problems and disadvantages which the present invention overcomes are: the inability of many previous clipless pedal system designs to allow for appropriate natural rotational motion of the bicyclist's knee joint and lower leg as the bicycle is pedaled (This is commonly referred to by those knowledgeable in the art as "pedal float", or "float"); the tendency of the pedal, the engaging mechanism, and the cleat to collect debris and mud in the numerous recesses and narrow passageways of the pedal and cleat, a particular problem with mountain biking, the practitioners of which often walk through streams and over other unimproved terrain; incompatibility of many clipless pedal systems for use on both road and mountain bikes, and thus the necessity for the bicycling enthusiast to purchase and maintain separate shoes, cleats and pedals for each type of riding; the lack of the capability to provide optimal foot positioning on the pedal without being "clipped in", which is particularly important for mountain bike racers and riders, who may wish to be attached to their pedals when the course is predictable, but may also wish to ride "unattached" while continuing to maintain optimal positioning of the foot on the pedal when the course becomes more difficult, so that a foot will be instantly available when needed.

According to experts in the field of sports medicine and orthopedics there are several characteristics that are desirable in clipless pedal systems. One of these characteristics is pedal float, as discussed above. However, simply providing a certain number of degrees of float is not sufficient. Neither is providing a greater number of degrees of float, or providing unlimited float. Certain other requirements must be met, among the most important of which are:

1) The cleat must be positively and firmly captured and retained in the pedal throughout the full range of float. This requirement avoids unexpected, and therefore, dangerous releases.
2) The center, or neutral, position of the float must be adjustable relative to the fore- and aft axis of the bicycle. This allows cyclists with varying degrees of pronation to adjust the clipless pedal system to their specific body and needs.
3) The amount of float must be variable to accommodate the specific needs of individual bicyclists. Generally the required range of float is from 3 to 8 degrees, though some riders will require more.
4) The float must be limited. Unlimited float is inefficient because the bicyclist will expend energy controlling the rotational motion of the lower leg.
5) The end-points of the float, i.e., the point at which the pedal begins to release the cleat, must be firm and easily detectable by the bicyclist. If the end points of the float are not detectable a leg muscle will have to fire to stop the leg's rotation, which diverts energy from the primary objective of pedaling the bicycle.
6) To maintain maximum pedalling efficiency the axis of rotation of the float must be through the center of the pedal so that the ball of the foot remains correctly located on the pedal.
7) The cleat must safely release from the pedal under emergency conditions. This is an obvious requirement.

BACKGROUND—PRIOR PATENTED ART

A partial listing of patents which disclose pertinent art in the field of clipless bicycle pedals includes: U.S. Pat. No. 4,893,523, which issued on Jan. 16, 1990 to Dan C. Lennon; U.S. Pat. No. 4,942,778, which issued on Jul. 24, 1990 to Richard M. Bryne; U.S. Pat. No. 5,046,382, which issued on Sep. 10, 1991 to John D. Steinberg; U.S. Pat. No. 5,279,184, which issued on Jan. 18, 1994 to Kouichiro Ogino; U.S. Pat. No. 5,284,066, which issued on Feb. 8, 1994 to Jonathan Weiss; U.S. Pat. No. 5,325,738, which issued on Jul. 5, 1994 to Richard M. Bryne; and U.S. Pat. No. 5,381,708, which issued on Jan. 17, 1995 to Wan M. Liao. While the art disclosed in these patents attempts to overcome the problems summarized earlier, none satisfactorily deals with all of the issues.

Bryne's '778 patent allows a limited amount of float before disengagement, which attempts to deal with the knee motion problem. However, the linear aspect of the grooves restricts the allowable rotational angle to a few degrees, which will not accommodate the full range of bicyclists. Furthermore, again due to the linear aspect of the grooves, partial disengagement occurs after a small rotation of the cleat, which may lead to unexpected premature release and possible injury to the bicyclist. Still further, adjustment of the center of float is not provided for, and the engaging mechanism disclosed in '778 is contained in a recessed cavity attached to the bicyclist's shoe, which cavity will become packed with mud and debris when the bicyclist walks on unpaved surfaces, rendering the system inoperative. Such a design is useless for mountain bike riders, and thus fails the road bike/mountain bike compatibility objective. Further, Bryne's '778 patent shows no provision for unattached pedaling. Bryne's '738 patent has similar deficiencies with respect to limited rotation, center-of-float adjustment, and mud clogging. The '738 patent does allow for "unattached" operation, but has no provision for foot positioning, and thus will allow the bicyclist's foot to slide all over the pedal.

Ogino's '184 patent fails the rotational motion objective, is weak in the dirt and mud clogging area, has no provisions for mud clearing, and does not allow for "unattached" optimally positioned pedaling. Steinberg's '382 patent and Weiss' '066 patent also fail the rotational motion objective, are weak in the dirt and mud clogging area, and do not allow for "unattached" optimally positioned pedaling.

Liao's '708 patent discloses and claims a pair of arciform shaped flanges, and an adapter plate which is attached to a cycling shoe, and which can be releasably captured between the flanges. However, this approach does not allow for any appreciable float, and thus fails all of the float-related objectives.

Lennon's '523 patent discloses and claims a cylindrical, flanged stud depending from a plate attached to the cyclist's shoe. The stud engages one of several recesses in a plate fixed to the pedal. The stud may also be positioned at a non-engaged location for un-attached riding. This system is deficient in several critical areas, namely, it allows unlimited float which is not desirable, there are no detectable end points of float, the amount of float is not adjustable, the center of rotation is not through the center of the pedal, the un-attached riding position is sub-optimal, and there is no provision for safety release.

SUMMARY OF THE INVENTION

The present invention discloses innovative new art in the field, which results in major improvements in clipless pedal systems. These improvements overcome several serious disadvantages in existing systems, some of which are: the inability of many systems to securely retain the cleat throughout the full range of float; the inability of previous systems to allow sufficient yet controlled rotation of the cleat, and thereby the rider's lower leg and knee joint, without disengaging; the lack of a provision in most systems to allow the neutral point to be adjusted; the lack of detectable end points of the float; sub-optimal center of float rotation; no provision for optimally positioned un-attached riding; and incompatibility of many clipless pedal systems for use on both road and off-road bicycles.

In addition to overcoming deficiencies of existing clipless pedal system, the present invention retains all of the advantages disclosed and enumerated in prior art. Among these advantages are: a system that is easily engaged and released when desired, that allows a high cornering angle of the bicycle when the inside pedal is at the six o'clock position, and a small sized, flat cleat that projects minimally from the bottom of a road bike shoe, and resides within the recessed area of off-road shoes.

For brevity and convenience herein, the combination of the cleat and pedal will be referred to as the "clipless pedal" or "clipless pedal system," including both the cleat and the pedal with engaging mechanism mounted thereon, this terminology being common in the art. It will be easily determinable by those skilled in the art when the ensuing discussion refers to the system and when it refers separately to the cleat or the pedal.

A clipless pedal system as disclosed in the present invention comprises numerous elements from prior art, namely, a pedal and cleat, the pedal consisting of a spindle or axle attached to the end of a bicycle crank arm, on which spindle is mounted a pedal body, the pedal body typically being connected to the spindle through an anti-friction bearing arrangement, and having attached thereto a plurality of engaging mechanisms.

The cleat and the engaging mechanism are the principal innovations of the present invention. The cleat is cylindrical in shape, with at least two slots of a fractionally cylindrical shape formed in the outer cylindrical surface. The tongue of the engaging mechanism has a corresponding fractionally cylindrical shape adapted to be removably seated in the slots on the cleat, under the influence of the spring. The tongue and slots cooperate to releasably capture the cleat, and thereby the bicyclist's shoe and foot, on the pedal. Owing to the cylindrical aspect of the cleat, slots, and tongue, the cleat is free to rotate while remaining firmly captured by the tongues, thereby providing the desired float. The amount of float can easily be varied by adjusting the relative arc length of the slots with respect to the arc length of the fractionally cylindrical portion of the tongues. Furthermore, the center of rotation of the cleat, and thus the rider's foot, is positioned at the optimal point, a vertical axis through the center of the pedal. In addition, the limits of float are easily detectable by the rider as the tongue encounters the faired portion at either end of the slot causing a resistance to further rotation due to the action of the spring in cooperation with the tongue. The lower portion of the cleat is chamfered to facilitate engagement with the tongue. In the preferred embodiment the tongue points inwardly toward the center of the pedal, though other arrangements are possible.

To insure release of the cleat under emergency conditions, the lower surface of the fractionally cylindrical slot and the lower lip of the tongue may have a bevel. The bevel assures that upward force on the cleat will unseat the tongue from the slot and release the cleat.

The cleat is mounted on a cycling shoe by a clamp, which in turn is attached to the shoe by any of the well known conventional methods. The clamp is cylindrical in shape, and has a flange at the lower end, which forms an annular surface. The flange of the clamp engages an interior annular surface of the cleat and secures the cleat to the shoe. Serrations on the opposing annular surfaces restrict the cleat from rotating with respect to the clamp, and also allow the angular position of the cleat to be adjusted relative to the clamp, and thereby relative to the longitudinal axis of the cyclist's shoe. This allows the neutral position or center of the float to be adjusted to suit the individual bicyclist, one of the key improvements not heretofore available in clipless pedal systems.

OBJECTS AND ADVANTAGES OF THE CLIPLESS PEDAL SYSTEM

Accordingly, several objects and advantages of the present invention are:

(a) to provide a clipless pedal system that allows the rider to adjust or bias the longitudinal center or neutral float position of the foot on the pedal;

(b) to provide a clipless pedal system that safely releases under emergency conditions;

(c) to provide a clipless pedal system that provides the bicyclist with a firm indication that may be felt when the extent of the pedal's float has been reached;

(d) to provide a clipless pedal system that has an optimum axis of rotation of float;

(e) to provide a clipless pedal system that firmly and securely retains the cleat throughout the full range of float;

(f) to provide a clipless pedal system that allows the bicyclist to select a custom float angle appropriate to his or her individual physiology.

(g) to provide a clipless pedal system that provides optimal foot positioning during un-attached riding.

Further objects and advantages will become apparent from a consideration of the ensuing description and drawings.

BRIEF DESCRIPTION OF THE DRAWING FIGURES

FIG. 4-A is an orthogonal partial cross-section taken at line 4—4 in FIG. 5 showing details of the engaging mechanism.

FIG. 4-B is an orthogonal partial cross-section taken at line 4—4 in FIG. 5 showing details of another embodiment of the tongue and cleat.

FIG. 5-A shows an alternative embodiment of the engaging mechanism and the cleat.

FIG. 5-B shows details of an embodiment having a hollow cleat and an outward-facing tongue.

FIG. 9-A shows details of the indexing serrations.

FIG. 9-B is a bottom view of the cleat and clamp.

| Reference Numerals in Drawings | | | |
|---|---|---|---|
| 1 | Lateral Pedal Axis | 17 | Cleat Cylindrical Axis |
| 10 | Cleat | 18 | Pedal |
| 101 | Clamp | 20 | Tongue |
| 102 | Upper Cylindrical Portion | 21 | Fractionally Cylindrical Portion |
| 103 | Flange | | |
| 105 | Cleat Annular Surface | 201 | Upper Lip |
| 106 | Clamp Annular Surface | 202 | Lower Lip |
| 107 | Serrations | 22 | Tongue Cylindrical Surface |
| 108 | Center Mark | 40 | Spring |
| 109 | Index Mark | 41 | Engaging Mechanism |
| 110 | Upper Portion | 42 | Housing |
| 111 | Lower Portion | 50 | Body |
| 112 | Inner Surface | 51 | First Surface |
| 11 | Attachment Slot | 52 | Second Surface |
| 11a | Attachment Screw Hole | 53 | Center of Pedal Body |
| 12 | Fractionally Cylindrical Slot | 54 | Leading Edge |
| 121 | Wall | 55 | Trailing Edge |
| 122 | Upper Surface | 60 | Axle |
| 123 | Lower Surface | 61 | Threads |
| 14 | Chamfer | 71 | First (Float) Angle |
| 15 | Cleat Cylindrical Surface | 72 | Second (Release) Angle |
| 16 | Faired Portion | 85 | Positioning Ring |
| | | 86 | Skirt |

DESCRIPTION OF THE PREFERRED EMBODIMENTS

Figure 1:
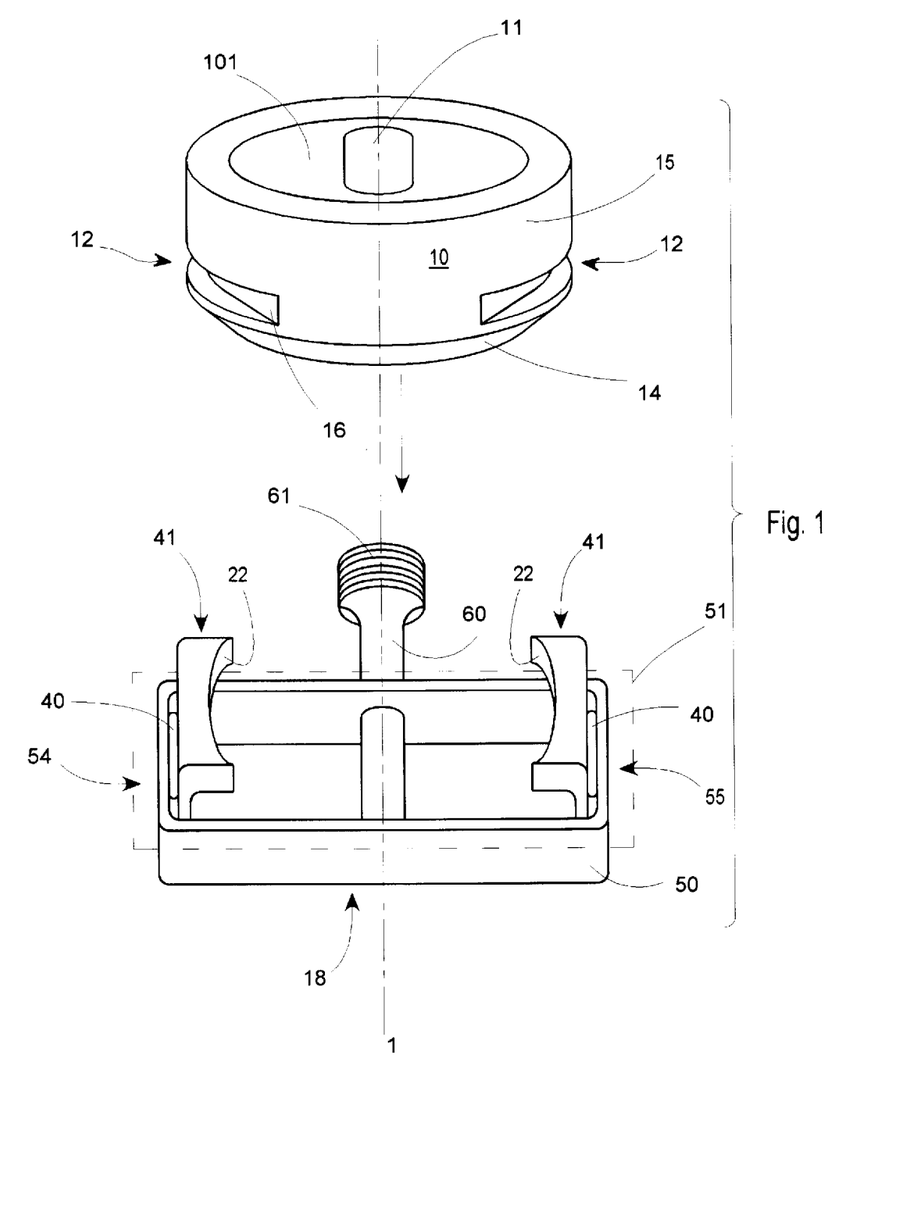
FIG.1 shows the cleat, clamp, and pedal in perspective as viewed from the left side of a bicycle.

The invention disclosed herein may be easily understood by reference to the accompanying drawings. FIG. 1 shows pedal 18, cleat 10, and clamp 101 in perspective view. For future reference, in FIGS. 1, 5, 10, 11 and 12 the view is from the left side of a bicycle. The front of the bicycle is on the left. The leading edge of pedal 18 and cleat 10 is toward the left and the trailing edge toward the right.

Figure 4:
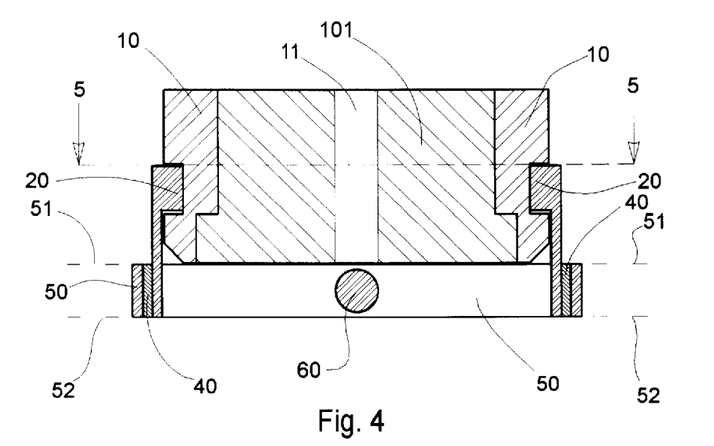
FIG. 4 shows an orthogonal vertical cross-section of the cleat and clamp captured in the pedal, taken at line 4—4 in FIG. 5.

Referring now to FIGS. 1 and 4, pedal 18 comprises body 50, with first surface 51 and second surface 52, axle 60 with threads 61, threads 61 being the conventional method of attaching a pedal to the end of a bicycle crank arm, and engaging mechanisms 41, which are attached to and project outwardly from body 50. Referring now also to FIGS. 4-A and 4-B, engaging mechanism 41 comprises tongue 20 and spring 40. Tongue 20 further comprises an upper lip 201, a lower lip 202, and a fractionally cylindrical surface 22. Lower lip 202 may be beveled as shown in FIG. 4-B. Upper lip 201, fractionally cylindrical surface 22 and lower lip 202 define fractionally cylindrical portion 21 of tongue 20. The basic connections between body 50 and axle 60 are conventional and well known to those knowledgeable in the art. Also, various methods are disclosed in prior art for attaching engaging mechanism 41 to body 50; the selection of a specific method is not germane to the present invention.

Figure 2:
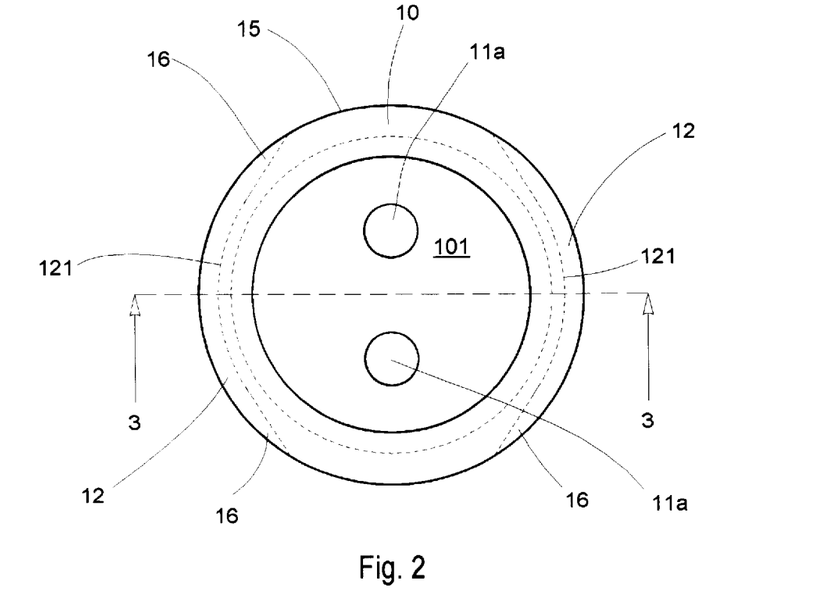
FIG. 2 shows an orthogonal top view of the cleat and clamp.
Figure 3:
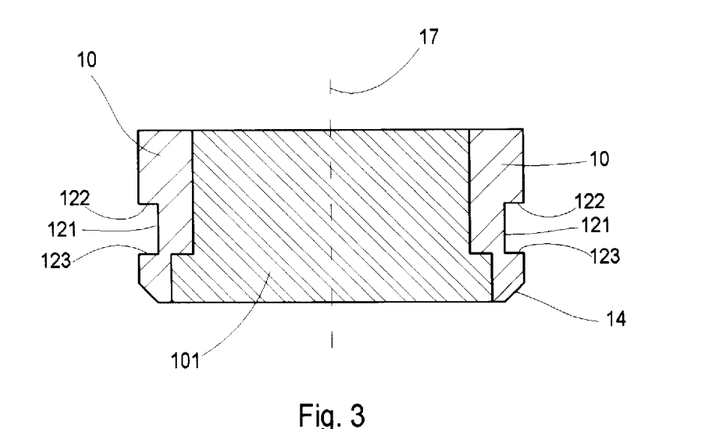
FIG. 3 shows an orthogonal vertical cross-section of the cleat and clamp taken at line 3—3 in FIG. 2.
Figure 8:
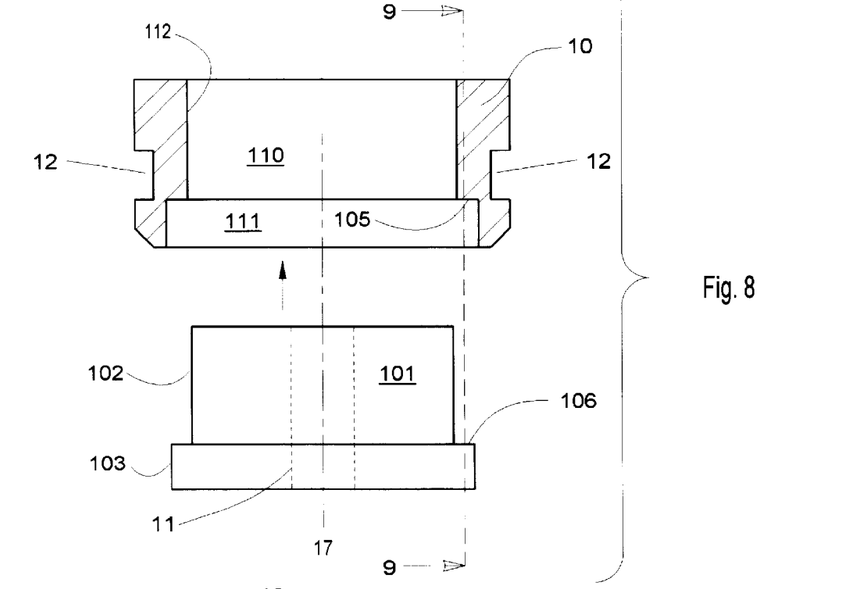
FIG. 8 shows the cleat and clamp separated, with the cleat in cross section taken at line 3—3 in FIG. 2.

Cleat 10 and tongue 20 are the principal innovative elements of this invention. Cleat 10 is a short, hollow cylinder or disc of circular cross section. The cylindrical axis 17 of cleat 10 is generally perpendicular to the sole of a rider's shoe when mounted thereon. Referring now to FIG. 8, inner surface 112 of cleat 10 comprises an upper portion 110 being of a first diameter, and a lower portion 111 being of a second, larger diameter, both diameters being concentric with cylindrical axis 17. The transition between upper portion 110 and lower portion 111 defines a cleat annular surface 105 on which are a plurality of radially aligned serrations 107', shown in enlarged detail in FIG. 9-A. Formed in the outer surface of cleat 10 are a plurality of fractionally cylindrical slots 12. Referring now to FIGS. 2 and 3, fractionally cylindrical slot 12 is defined by an upper surface 122, a wall 121, a lower surface 123, and faired portions 16. Lower surface 123 may be beveled as shown in FIG. 4-B. At the lowermost exterior part of cleat 10 is chamfer 14 which facilitates cleat 10 entering engaging mechanism 41 when the rider steps onto pedal 18.

Figure 9:
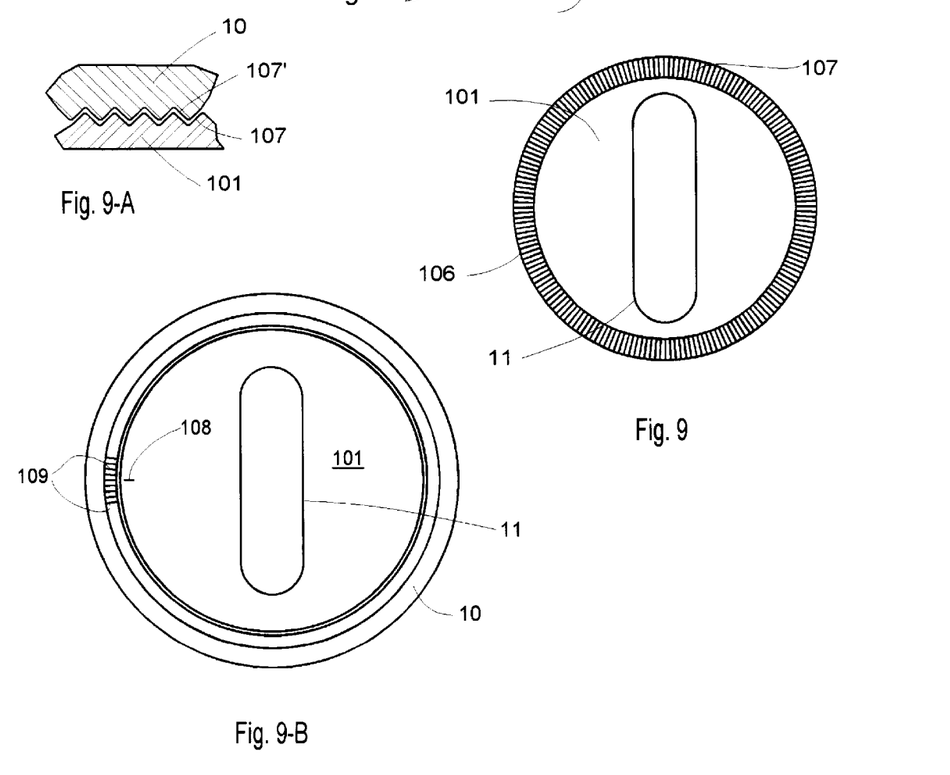
FIG. 9 shows a top view of the clamp.

Cleat 10 is affixed to the sole of a bicycling shoe by clamp 101. Referring now to FIGS. 2, 3, and 8, clamp 101 is a cylinder of circular cross section and has an upper portion 102 and a flange 103, both being concentric with cleat axis 17. The transition between upper portion 102 and flange 103 defines clamp annular surface 106 on which are a plurality of radially aligned serrations 107. Clamp 101 is adapted to engage cleat 10, as shown in FIG. 3, and to hold cleat 10 firmly against the sole of a bicycling shoe. Clamp 101 is attached to the shoe using attachment slot 11, shown in FIG. 1, or attachment screw holes 11a, shown in FIG. 2, by any of several well known conventional methods. When cleat 10 and clamp 101 are mounted on the shoe, serrations 107' and 107 are engaged as shown in FIG. 9-A and prevent rotation of cleat 10 about cleat cylindrical axis 17.

In the preferred embodiment there are two fractionally cylindrical slots 12, one of which is oriented toward the leading edge, and the other toward the trailing edge of cleat 10. Other numbers and orientations of fractionally cylindrical slots 12 are possible.

FIGS. 4 and 4-A show spring 40 disposed between body 50 and extension 30. As shown in FIG. 4, spring 40 cooperates with body 50 and tongue 20 to removably seat tongue 20 in fractionally cylindrical slot 12, thereby capturing cleat 10 on pedal 18.

The cross sectional profile of fractionally cylindrical slots 12 and tongues 20 is not critical so long as slots 12 cooperate with fractionally cylindrical portions 21 such that tongues 20 may be removably seated in slots 12 so as to securely hold cleat 10 in pedal 18 under the influence of springs 40 during normal conditions, and to release under emergency conditions. For example, lower surface 123 and lower lip 202 may be beveled as shown in FIG. 4-B to facilitate the unseating of tongue 20 from slot 12 in the event of an emergency.

Figure 5:
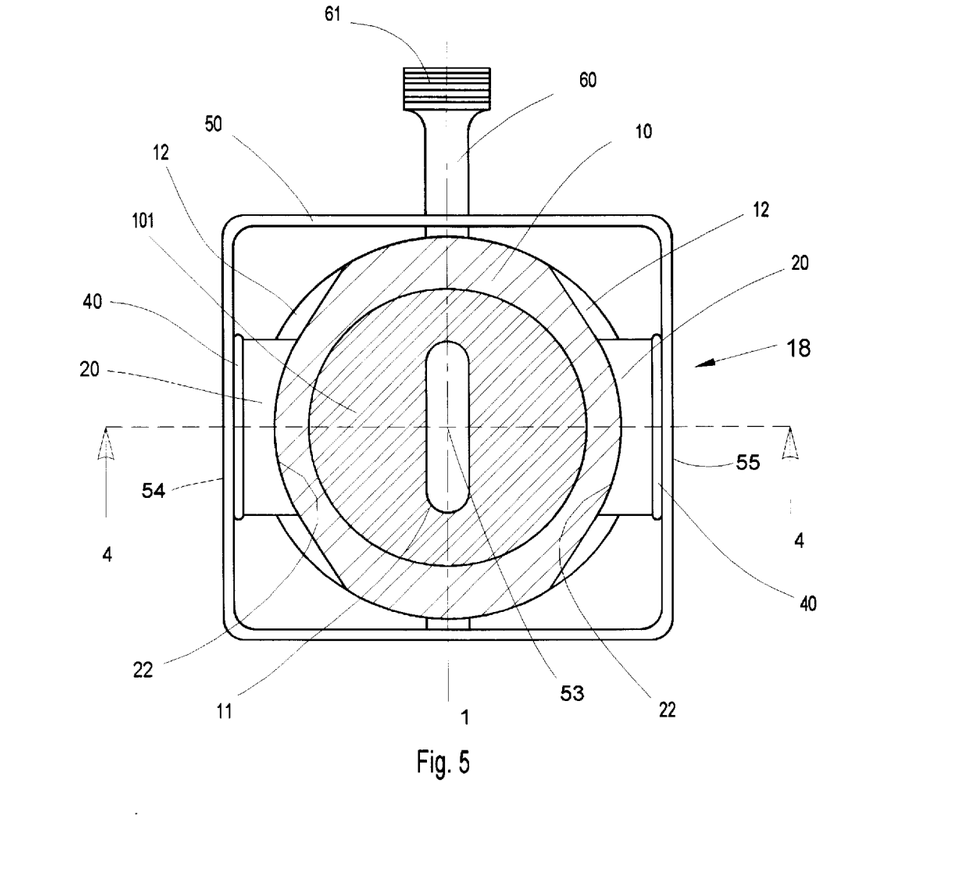
FIG. 5 is an orthogonal horizontal cross-section taken at line 5—5 in FIG. 4 showing the cleat captured in the pedal.
Figure 6:
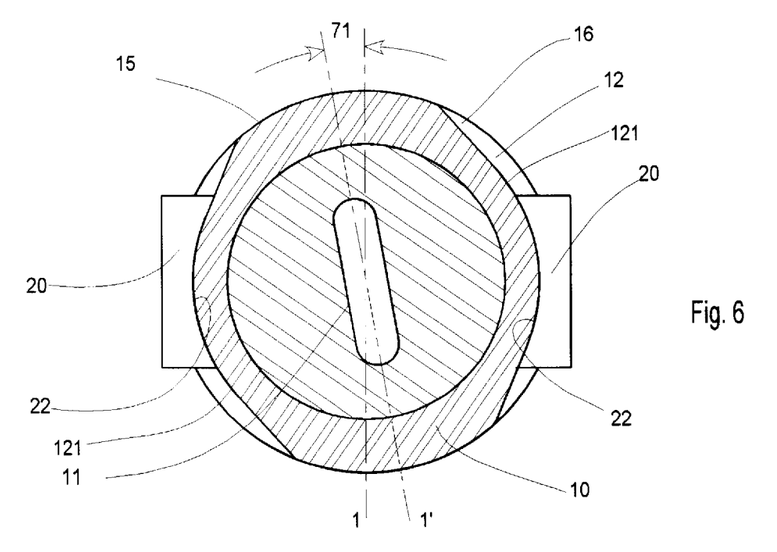
FIG. 6 shows an orthogonal horizontal cross-section taken at line 5—5 in FIG. 4, with the cleat having been rotated to a float angle.
Figure 7:
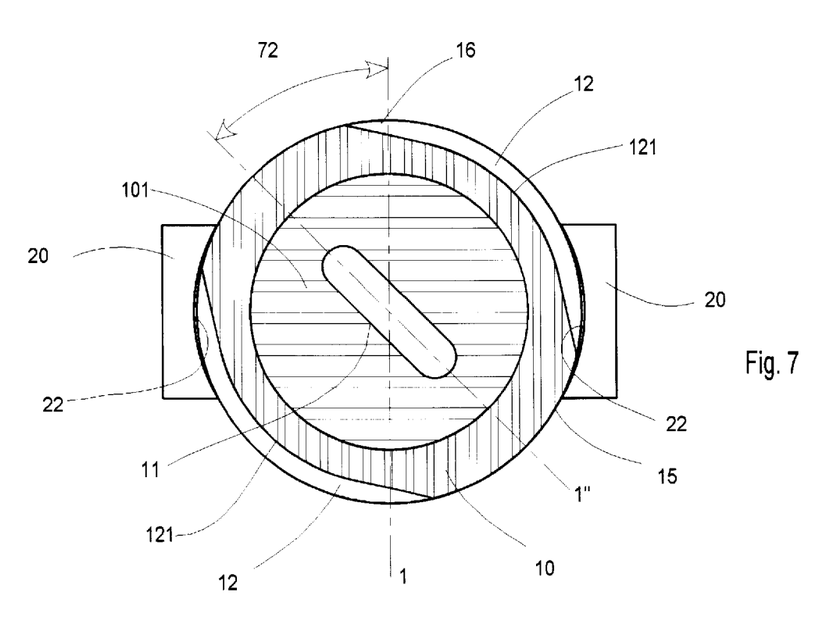
FIG. 7 shows an orthogonal horizontal cross-section taken at line 5—5 in FIG. 4, with the cleat having been rotated to a release angle.

FIG. 5 shows a horizontal cross section of cleat 10, clamp 101, and pedal 18 taken at line 5—5 in FIG. 4. This view shows tongues 20 seated in fractionally cylindrical slots 12 at both leading edge 54 and trailing edge 55. FIGS. 6 and 7 show views similar to that of FIG. 5, except that pedal body 50, axle 60, and springs 40 are omitted for clarity. In FIG. 6 cleat 10 has been rotated by a float angle 71 to axis 1', from its original position in alignment with lateral pedal axis 1. At float angle 71, tongues 20 remain firmly seated against wall 121, and cleat 10 is fully engaged by engaging mechanisms 41 and firmly captured on pedal 18, and will remain so for rotations of at least plus or minus float angle 71.

In FIG. 7, cleat 10 has been rotated to a release angle 72, from lateral pedal axis 1 to axis 1". At a rotation of release angle 72 or greater, tongues 20 are displaced out of fractionally cylindrical slots 12, and cleat 10 may be lifted from pedal 18, thereby disengaging cleat 10 and the rider's foot. Faired portion 16 creates a smooth transition into the adjacent cleat cylindrical surface 15, and assists in displacing tongue 20 from its seat in slot 12 as cleat 10 is rotated to and through release angle 72, thereby facilitating disengagement. The relative arc lengths of fractionally cylindrical slots 12 and fractionally cylindrical portions 21 may be optimized to achieve a desired amount of float while still allowing the rider to achieve release at a desired, controlled, and comfortable angle. Furthermore, the arc length of slots 12 may be varied to provide a specific amount of float appropriate to the needs of the rider. In practice, cleat 10 would be chosen from among a set of cleats 10 having different arc lengths of slots 12, if a greater or lesser amount of float is desired.

As cleat 10 is rotated through float angle 71 and approaches release angle 72, tongues 20 encounter faired portions 16, and tongues 20 will begin to disengage from slots 12. Because tongues 20 are under the influence of springs 40 the initiation of disengagement will cause a resistance to further rotation of cleat 10 that will be perceptible to the rider. Thus the rider will receive a positive indication that the end point of float has been reached.

In the present embodiment spring 40 is a pad of elastomeric material. Other embodiments are possible, including but not limited to, a coil spring, a leaf spring, an air spring, a helical spring, a torsional spring, or a spring wire. The arrangement and construction of clipless pedal systems employing these types of springs is conventional, well documented in prior art, and common knowledge among those skilled in the art. An example of an alternate embodiment is shown in FIG. 5-A, wherein tongue 20 is retained in and projects from a housing 42, which is affixed to body 50. Spring 40 cooperates with housing 42 and tongue 20 to urge tongue 20 into slot 12.

In the preferred embodiment tongues 20 project inwardly, and fractionally cylindrical slots 12 are disposed on the outer cylindrical surface of cleat 10. Other arrangements are possible. For example, as shown in FIG. 5-B, cleat 10 could be hollow with fractionally cylindrical slots 12 on inner surface 112. Tongue 20 would project outwardly and fractionally cylindrical portion 21 would be convex instead of concave.

FIG. 9 shows a top view of clamp 101, with serrations 107 visible on clamp annular surface 106. FIG. 9-A is an enlarged view of a partial cross section of cleat 10 and clamp 101 taken at line 9—9 in FIG. 8, with annular surfaces 105 and 106 in close proximity to show the interaction of serrations 107 on each annular surface. Serrations 107 and 107' interact firstly to prevent unwanted rotation of cleat 10 about clamp 101 when the assembly is mounted on a shoe, and secondly to provide fixed increments of rotation of cleat 10 with respect to clamp 101, thereby allowing adjustment of the neutral point of float. Referring to FIG. 9-B, which shows the assembly of cleat 10 and clamp 101 viewed from below, center mark 108 on clamp 101 is aligned with the horizontal axis of pedal 18 and thus with the horizontal axis of the shoe and rider's foot . Indexing marks 109 on cleat 10 are radially aligned with cleat cylindrical axis 17, and are spaced at equal angular intervals clockwise and counter-clockwise from center mark 108. Center mark 108 and indexing marks 109 cooperate to indicate the angular offset of the center or neutral position of the float, which may thus be set to the rider's exact requirements.

Figure 11:
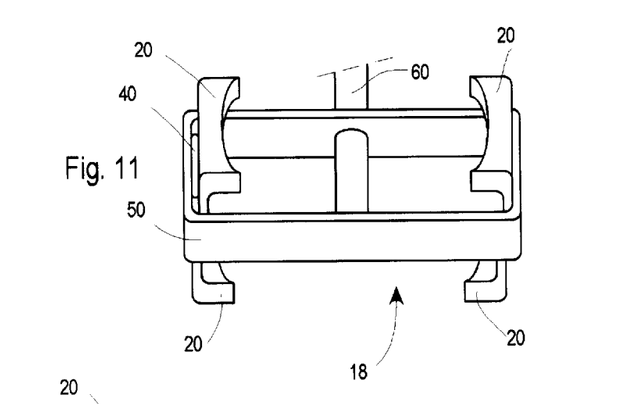
FIG. 11 shows a perspective view of the pedal with engaging means on both sides and a fixed tongue at the trailing edge.
Figure 12:
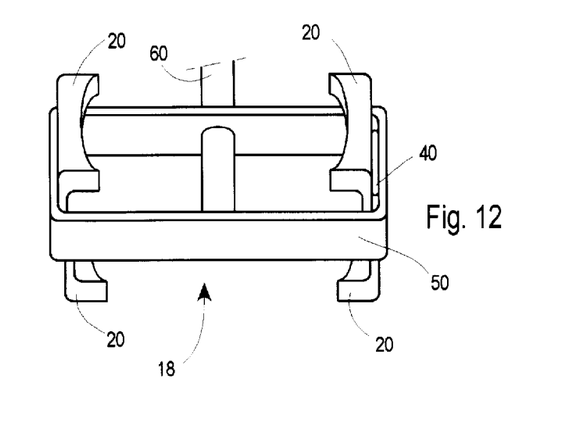
FIG. 12 shows a perspective view of the pedal with engaging means on both sides and a fixed tongue at the leading edge.

In the preferred embodiment there are two engaging mechanisms 41 on pedal 18. In another possible embodiment, shown in FIG. 12, tongue 20 is rigidly attached to leading edge 54, with engaging mechanism 41 disposed in the opposed position. Alternatively, as shown in FIG. 11, the rigidly attached tongue 20 is at trailing edge 55, with engaging mechanism 41 at leading edge 54. Another possible embodiment of the present invention is illustrated in FIGS. 11 and 12 wherein pedal 18 has engaging mechanisms 41 on both sides.

Figure 10:
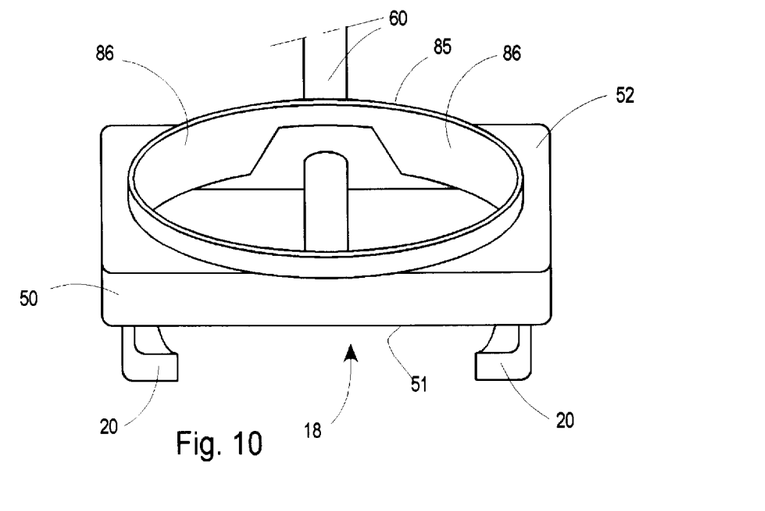
FIG. 10 shows a perspective view of the pedal with the positioning ring on the upper side.

FIG. 10 show a perspective view of pedal 18 with a second surface 52 uppermost. Visible on surface 51, (in this figure, now the underside of the pedal) are tongues 20. Disposed on second surface 52 is a positioning ring 85. Positioning ring 85 is of a suitable diameter to allow cleat 10 to slide vertically into and out of ring 85 without being captured, and is positioned on body 50 so as to provide optimal location of the rider's foot on pedal 18 for power transmission when the rider wishes to ride "unattached." Depending downwardly from the forward and rearward portions of the upper inside edge of ring 85 is a skirt 86. Skirt 86 prevents slots 12 in cleat 10 from inadvertently engaging cleat 10 in pedal 18 when the rider does not wish to do so.

DESCRIPTION OF OPERATION

Operation of the present invention may be best understood by referring to FIGS. 1, 4, 5, and 9-B. Cleat 10 is attached to the sole of a rider's shoe by clamp 101. After inserting clamp 101 into cleat 10 and prior to engaging serrations 107 and 107' the neutral, or straight ahead, point of the float is selected by rotating cleat 10 to the desired index mark 109 relative to center mark 108. Cleat 10 and clamp 101 are then secured to the shoe. Pedal 18 is attached to the crank arm of a bicycle by threads 61. When the rider wishes to "clip in", pedal 18 is rotated until engaging mechanisms 41 are uppermost (or, in the case of pedals with engaging mechanisms 41 on both surface 51 and surface 52, either engaging mechanism 41 may be on top), and steps down onto pedal 18. Chamfer 14 assists in displacing one or both tongues 20 until there is sufficient space between surfaces 22 of opposing tongues 20 to receive cleat 10. When slots 12 are aligned with tongues 20, tongues 20, under the urging of springs 40, resile into slots 12, thereby capturing cleat 10 on pedal 18.

Cleat 10 will remain captured by pedal 18 even though cleat 10 is rotated in a lateral plane in either angular direction up to a predetermined float angle 71, as may be seen from FIGS. 4, 5, and 6. This adjustable, positive retention float capability of the present invention is the most significant innovation and improvement over prior art, and allows for the natural rotation of a rider's foot, ankle, lower leg, and knee, and any or all of the preceding, thus preventing pain and injury to these body parts while riding the bicycle.

When the rider wishes to "clip out" or disengage from pedal 18, either or both heels of the bicyclist's feet may be rotated outwardly away from the bicycle to release angle 72, as shown in FIG. 7. When cleat 10 is rotated to or past release angle 72, tongues 20 are displaced from their seats in slots 12 with the assistance of faired portions 16, so that cylindrical surfaces 22 are clear of and no longer engaged by slots 12, and cleat 10 is released from pedal 18. Cleat 10 and the rider's foot may be removed from pedal 18 by lifting the foot in an upwardly direction.

When the rider wishes to ride unattached, pedal 18 is flipped over so that second surface 52 of pedal 18 with positioning ring 85 thereon is uppermost. The rider then steps down onto pedal 18, and cleat 10 reposes into and is positioned by ring 85. Because there is no engaging capability associated with ring 85, cleat 10 is free to rotate and to move vertically, but is constrained by ring 85 against horizontal and lateral movement with respect to pedal 18. Skirts 86 prevent slots 12 from inadvertently engaging in ring 85, while allowing free motion in a vertical direction and free rotation within ring 85. Cleat 10 is thus constrained in an optimal power transmission position on pedal 18. Furthermore, because cleat 10 is not captured on pedal 18, the rider may instantaneously remove the foot from pedal 18 to deal with obstacles or impediments on the course, or to steady the bicycle upon stopping.

The rider may choose an amount of float appropriate to his or her physiological requirement by simply selecting a cleat 10 from among a set of cleats 10 having different arc lengths of slots 12.

SUMMARY, RAMIFICATIONS, AND SCOPE

Accordingly, the reader will see and note that the clipless pedal system of the present invention provides significant advantages over existing systems. Specifically, the present invention provides individually optimized pedal float to promote safe, pain-free, non-injurious riding with a clipless pedal system;

provides a clipless pedal system that allows the rider to adjust or bias the longitudinal center or neutral float position of the foot on the pedal;

provides a clipless pedal system that provides the rider with a firm indication that an extreme of the pedal's float has been reached;

provides a clipless pedal system that allows the rider to select a custom float angle appropriate to his or her individual physiology;

provides a clipless pedal system that has an optimum axis of rotation of float;

provides a clipless pedal system that firmly and securely retains the cleat throughout the full range of float;

provides a clipless pedal system that safely releases under emergency conditions;

provides a single clipless pedal system that is useful and compatible for both road and mountain bikes;

provides a clipless pedal system that allows the same cleat and shoe to be used for both road and mountain biking;

provides optimal foot positioning on the pedal without having to be clipped in;

provides the choice of riding either "attached" or "unattached";

provides a clipless pedal system with minimal locations where dirt, mud, or debris is prone to accumulate.

Although the above description contains many specificities, these should not be construed as limiting the scope of the invention, but as merely providing illustrations and examples of some of the presently preferred embodiments of this invention. For example, an embodiment of this invention for a road bike would have engaging mechanisms on one side only. Furthermore, there are many alternatives for placement of the engaging mechanisms on the pedal body and the corresponding slots in the cleat. For example, there may be two engaging mechanisms each oriented towards the sides of the pedal, as opposed to the front and the rear. Alternatively, there could be three engaging mechanisms, at 120° angles around the pedal. And in yet another alternative embodiment the cleat could be hollow, with the slots formed in the interior cylindrical surfaces, with the tongues of the engaging mechanisms pointing outwardly and having a convex cylindrical shaped surface. In another possible embodiment, there could be one spring actuated engaging mechanism and one fixed engaging mechanism, in which case the fixed and the spring actuated engaging mechanisms would be on opposite sides of the pedal, and either the fixed or the spring actuated engaging mechanism could be at the front of the pedal, or vice versa.

Thus the scope of the invention should be determined by the appended claims and their legal equivalents, rather than by the examples given.

We claim:

1. A clipless bicycle pedal system for releasably attaching a bicyclist's shoe to a bicycle, said clipless bicycle pedal system comprising:

a pedal body rotatably mounted on an axle, said axle being removably attached to a crank arm of a bicycle, said pedal body having a center, a leading edge and a trailing edge, and having a first and a second surface; and a cleat comprising a cylindrical portion having a plurality of fractionally cylindrical slots of predetermined first arc length formed therein, and having mounting means for affixing said cleat to a bicycling shoe and a vertical axis coincident with the arc center of the cylindrical slots; and a plurality of engaging mechanisms disposed on either or both of said first and second surfaces, each of said engaging mechanisms comprising a tongue and an urging means, said tongue having a fractionally cylindrical portion of predetermined second arc length, said tongue cooperating with said urging means and being adapted to resile into and be removably seated in one of said slots in said cleat under the influence of said urging means; and wherein the tongue fractionally cylindrical portions combine and cooperate with said fractionally cylindrical slots to releasably capture said cleat on the pedal and allow said cleat to rotate about said vertical axis up to plus or minus a predetermined angle, thereby providing pedal float, and wherein said cleat will be released from the pedal when said cleat is rotated to an angle greater than said predetermined angle.

2. The pedal system of claim 1 wherein said cylindrical portion is a hollow cylinder having an inner surface, said inner surface having an upper portion of a predetermined first diameter and a lower portion of a predetermined second diameter larger than said first diameter, the transition between said upper portion and said lower portion defining a cleat annular surface; and     said pedal system further comprising a clamp having an upper cylindrical portion and a flange, the transition between said upper cylindrical portion and said flange defining a clamp annular surface, said clamp having attachment means for affixing said clamp to a bicycling shoe, and said clamp being adapted to engage and mount said cleat on a bicycling shoe; and     said pedal system further comprising indexing means disposed on the annular surfaces of each of said clamp and said cleat wherein said indexing means cooperate so as to determine and control the angular orientation of said fractionally cylindrical slots with respect to said clamp such that said angular orientation may be adjusted to suit the individual needs of a bicyclist, and once adjusted said angular orientation will remain fixed until re-adjusted by the user.

3. The pedal system of claim 2 wherein both said clamp and said cleat have indicating means disposed thereon to indicate the relative angular orientation of said fractionally cylindrical slots with respect to said clamp, and wherein said indicating means combine and cooperate with said indexing means to allow a bicyclist to adjust the neutral position of said pedal float to the bicyclist's individual requirements.

4. A pedal system as in claim 2 wherein said plurality of slots in said cleat comprise two slots disposed on diametrically opposite sides of said cleat, and wherein said plurality of engaging mechanisms comprise two engaging mechanisms, disposed on diagonally opposite edges of said pedal body.

5. A pedal system as in claim 2 wherein said fractionally cylindrical portion of said tongue is concave and inwardly directed toward said center of said pedal body, and said tongue further comprises an upper lip, a tongue cylindrical surface and a lower lip, and said fractionally cylindrical slot further comprises an upper surface, a wall, a lower surface, and a faired portion at each end of said slot, and wherein said lower lip and said lower surface are beveled and cooperate together under emergency conditions to unseat said tongue from said slot, and thereby disengage said cleat from said pedal.

6. A pedal system as in claim 2 wherein said urging means are chosen from the group consisting of a coil spring, and a spring element composed of elastomeric material.

7. A pedal system as in claim 1 wherein said plurality of engaging mechanisms are disposed on said first surface and said second surface of said pedal body.

8. A pedal system as in claim 1 wherein said plurality of engaging mechanisms comprise one engaging mechanism disposed toward said trailing edge of said pedal body, and further comprising a fixed tongue disposed at and rigidly affixed to said leading edge of said pedal body.

9. A pedal system as in claim 1 wherein said plurality of engaging mechanisms comprise one engaging mechanism disposed toward said leading edge of said pedal body, and further comprising a fixed tongue disposed at and rigidly affixed to said trailing edge of said pedal body.

10. The pedal system of claim 1 wherein said vertical axis is through said center of said pedal body.

11. A clipless bicycle pedal system for releasably attaching a bicyclist's shoe to a bicycle, said clipless bicycle pedal system comprising:

a pedal body rotatably mounted on an axle, said axle being removably attached to a crank arm of a bicycle, said pedal body having a center, a leading edge and a trailing edge, and having a first and a second surface; and     a cleat comprising a cylindrical portion having an outer cylindrical surface, said outer cylindrical surface having a plurality of fractionally cylindrical slots of predetermined first arc length formed therein, and a vertical axis coincident with the arc center of the cylindrical slots said cleat being affixed to said first surface; and     a plurality of engaging mechanisms, each of said engaging mechanisms comprising a tongue and an urging means, said tongue having a fractionally cylindrical portion of predetermined second arc length less than said first arc length, said tongue cooperating with said urging means and being adapted to resile into and be removably seated in one of the slots in said cleat under the influence of said urging means, and having mounting means for affixing said plurality of engaging mechanisms to a bicycling shoe; and     wherein the tongue fractionally cylindrical portions combine and cooperate with said fractionally cylindrical slots to releasably capture said plurality of engaging mechanisms on the pedal and allow the engaging mechanisms to rotate about said vertical axis up to plus or minus a predetermined angle, thereby providing pedal float, and wherein said plurality of engaging mechanisms will be released from the pedal when said plurality of engaging mechanisms are rotated to an angle greater than said predetermined angle.

\* \* \* \* \*